Nov. 11, 1952  J. S. BALLANTINE  2,617,866
PLANER AND THICKNESS INDICATING ATTACHMENT THEREFOR
Filed Nov. 29, 1948  2 SHEETS—SHEET 2
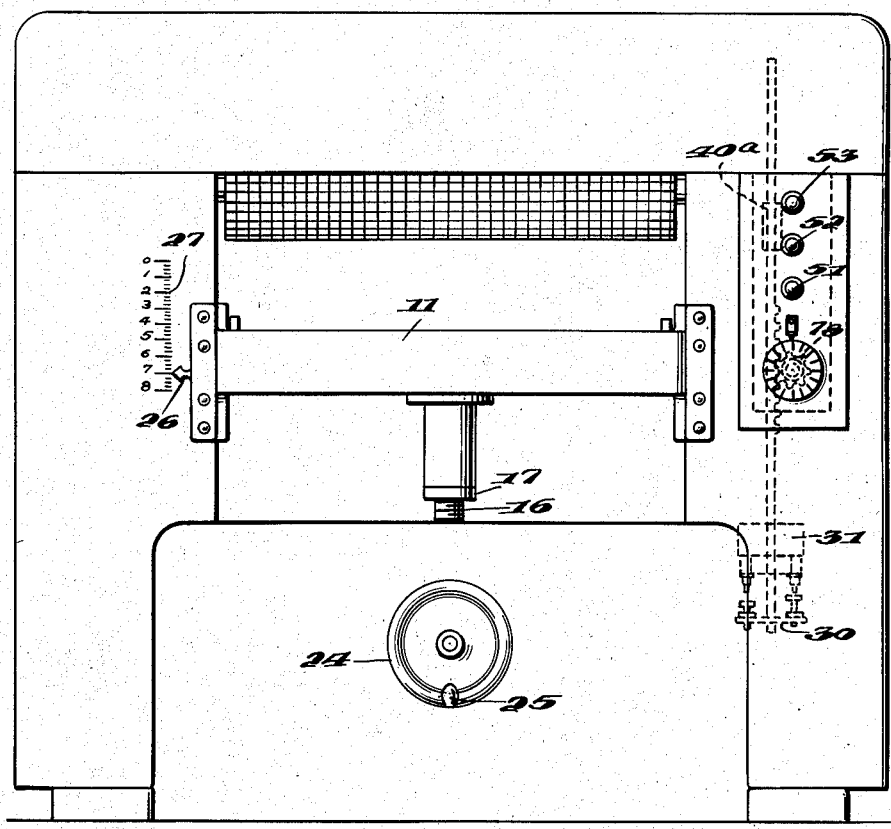
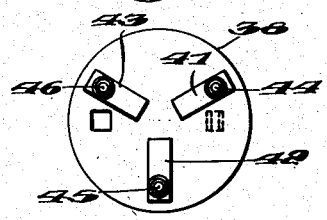
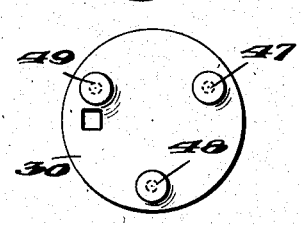
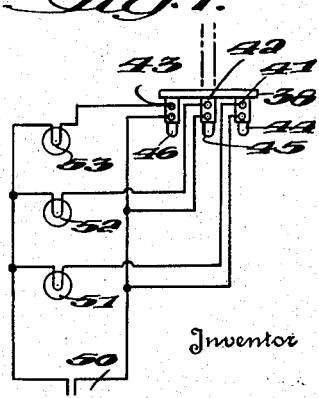
Inventor
J. S. BALLANTINE,
By Parry + Miller
Attorneys Patented Nov. 11, 1952

2,617,866

UNITED STATES PATENT OFFICE 2,617,866

PLANER AND THICKNESS INDICATING ATTACHMENT THEREFOR

James S. Ballantine, Absecon, N. J.

Application November 29, 1948, Serial No. 62,438

11 Claims. (Cl. 177—311)

This invention relates to planers of the type having a cutter and a work supporting table mounted for relative movement to vary cut thickness and is particularly concerned with sensitive indicating mechanism for such a machine which will show with a high degree of precision and fine tolerance when the machine is set for any predetermined cut thickness. Such indicator mechanism may be built into new planers and is so designed that it may be supplied as an attachment for existing planers.

Commercial planers are usually of two general types. In one type the work such as a plank or the like is supported on a table which is adjustable toward a fixed cutter member to remove successive increments of material until the desired cut thickness is obtained. In others the rotary cutter is moved toward a stationary work table to accomplish a similar result. In both types it is generally necessary to provide some form of indicating means to enable the operator to determine, at least approximately, the particular cut thickness dimension for which the machine is set.

The form of indicating means generally used for this purpose comprises a pointer suitably attached to the movable machine member of the planer, i. e., the movable work supporting table or cutter head as the case may be, and movable over a fixed scale which is calibrated so that the pointer indicates the particular cut thickness dimension for which the machine is set. Such indicating devices require the constant attention of the operator each time the machine is adjusted and are extremely difficult to read and set for a desired cut thickness dimension where the tolerances are small or an accurate cut thickness dimension is required. As a result cut thickness dimensions obtained using this type of device are usually only approximate and even these require fatiguing effort and concentration on the part of the operator.

In accordance with this invention it is proposed to provide sensitive indicating means for planers which may be used as the sole indicating means or in combination with existing indicating means such as the scale and pointer type, and which may be set to indicate, with a high degree of accuracy, when the machine is adjusted for a desired cut thickness dimension. When used as the sole indicating means a desired cut thickness dimension is obtainable with great accuracy and with a minimum of effort and attention on the part of the operator. When used in conjunction with existing indicating means the work may be reduced in thickness to an approximate dimension somewhat short of the desired cut thickness dimension utilizing the existing indicating means and the desired final thickness accurately obtained by use of the indicating attachment according to the present invention.

A primary object of this invention therefore is the provision of a planer adapted to accurately indicate in any suitable manner when the machine is adjusted to obtain a predetermined desired cut thickness dimension.

A further object of the invention is the provision of a planer having novel cut thickness indicating means which will overcome the disadvantages of prior indicating means of this type.

A still further object of the invention is the provision of cut thickness indicating means for a planer which is simple in construction, easy to install and operate, and requires a minimum of attention on the part of the operator.

Another object of the invention is the provision of a planer adapted to indicate when the machine is adjusted to obtain a predetermined cut thickness dimension which is slightly plus, correct, or slightly minus with relation to a selected cut thickness dimension.

Still another object of the invention is the provision of a planer attachment adapted to indicate by suitable signal or other indicating means when the planer is adjusted to obtain a desired cut thickness dimension of the work being planed.

A further object of the invention is the provision of an indicating attachment for a planer which may be set for any desired cut thickness dimension within the limits of the machine and which will indicate in response to movement of one of the machine members of said planer when the machine is adjusted to give a cut thickness dimension slightly plus, correct, or slightly minus that for which the indicating attachment is set. It is a related object to provide a cut thickness selector for adjusting the indicating mechanism for operation at any desired cut thickness.

A still further object of the invention is the provision of a visual indicating means for a planer which may be set for a desired cut thickness dimension and which has a series of signal devices adapted to be actuated in response to movement of one of the movable machine members of said planer to indicate when the planer is properly adjusted to give a predetermined cut thickness dimension which is slightly above the desired cut thickness dimension, right on the desired cut thickness dimension, and slightly below the desired cut thickness dimension.

Still another object of the invention is the provision of a planer having machine members including a cutter member and a work supporting table mounted for relative movement to vary cut thickness, a cut thickness indicating means, and selective actuating means operated by the movable one of said machine members through cut thickness varying movement thereof to actuate the indicating means as soon as a predetermined cut thickness has been reached.

Still another object of the invention is the provision of a visual indicating means for a planer comprising a series of lights which may be controlled to indicate when the planer is adjusted to give a desired thickness dimension and a selected thickness dimension above and below the desired thickness dimension.

These and other like objects and advantages of the invention will be apparent to persons skilled in the art to which the invention relates from a consideration of the accompanying drawings and annexed specification illustrating and describing a preferred embodiment of the invention.

In the drawings:

Fig. 3 is a front view of the device shown in Fig. 1;

Fig. 4 is a bottom view of the micro-switch mounting member;

Fig. 5 is a side elevational view partly in section of the micro-switch with the side removed;

Fig. 6 is a top view of the stop carrying members; and,

Fig. 7 is a diagrammatic view of the electrical hook-up.

Figures 1, 2:
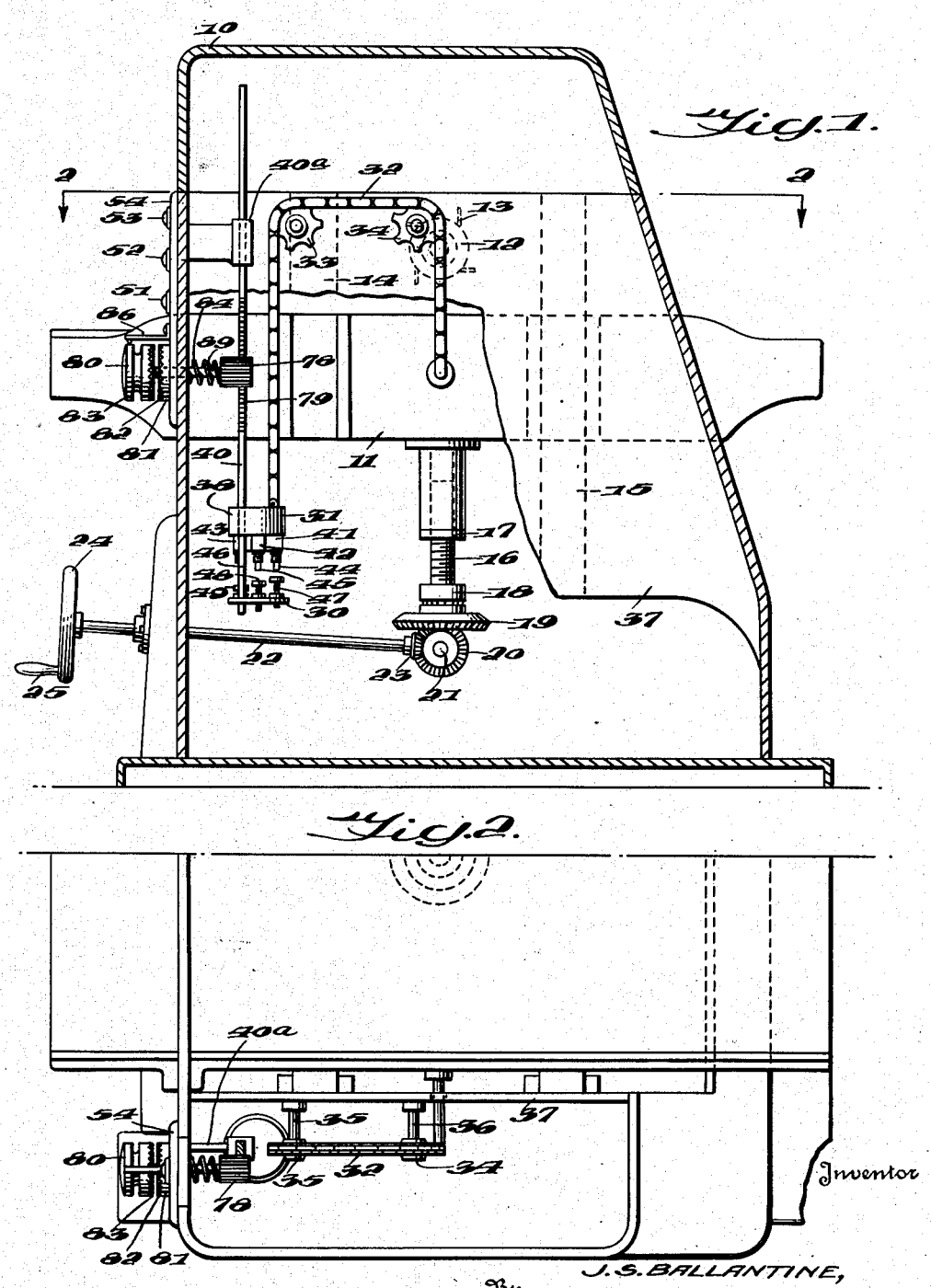
Fig. 1 is a vertical sectional view of a planer with portions thereof broken away showing the indicating attachment of the present invention mounted therein.
Fig. 2 is a sectional view taken on the line 2—2 of Fig. 1.

The indicating attachment according to the invention is capable of use with any of the well known types of planing machines in commercial use and for purpose of illustration and description is shown as applied to a planer 10 having a movable work supporting table 11 and a rotary cutter head 12. The cutter head 12 is mounted in suitable bearings carried by the side frame members of the planer and is provided with cutters 13 adapted to plane the work in a well known manner.

The work supporting table 11 is slidably mounted on guides 14 and 15 carried by the side frames of the planer 10 and is moved upwardly and downwardly by a pair of screws 16 positioned on opposite sides thereof and centrally located between the front and rear guides 14 and 15. The screws 16 are screw-threadedly engaged with flanges 17 depending from opposite sides of the table 11 and are suitably supported and journalled adjacent their lower ends by bearings 18. Bevel gears 19 are keyed to the lower ends of screws 16 and mesh with bevel gears 20 on a countershaft 21. Countershaft 21 is rotated by a shaft 22 having a bevel gear 23 thereon adapted to mesh with one of the gears 20 or with a separate gear (not shown) mounted on the shaft 21. Shaft 22 projects outwardly through the front of the planer casing and carries a hand wheel 24 provided with a handle 25.

It will be apparent from the description thus far that the table 11 may be adjustably positioned relative to the cutter head 12 by rotating the hand wheel 24 in the proper direction. This operates through the system of gears and shafts above described to rotate the screws 16 and thus raise or lower the table 11 in accordance with the direction of rotation of the hand wheel 24. When properly adjusted to take a predetermined cut from a plank or the like such plank is placed on the planing table 11 and pushed therealong under the cutting head 12 in a well known manner. As the plank moves through the machine the cutters 13 of the cutter head 12 remove a thickness of material predetermined by the particular adjustment of the table 11 with respect to the cutter head 12.

In order to provide some visual indication of the distance between the table 11 and the cutter head 12 and thus enable the operator to determine the approximate cut thickness dimension obtainable for a particular setting of the machine the table 11 is desirably provided with a pointer 26 (Fig. 3) adapted to travel over a calibrated scale 27 and to indicate thereon the approximate distance in inches between the table 11 and the cutter head 12. Thus when it is desired to cut a plank to a predetermined approximate thickness dimension the scale 27 and pointer 26 may be used to set the machine to take off successive increments of material until the approximate desired thickness is obtained at which time the indicating means according to the present invention may be used in making the final adjustment for obtaining a finished product having the correct desired cut thickness dimension.

Such indicating means has actuating mechanism preferably comprising an adjustable stop carrying member 30 and a movable micro-switch mounting member 31. The micro-switch mounting member 31 is connected to the table 11 by a chain or the like 32 which travels over sprockets 33 and 34 mounted on shafts 35 and 36 secured to a side frame member 37 of the planer. Thus as the table 11 is moved upwardly or downwardly to vary the cut thickness the member 31 moves upwardly or downwardly a corresponding distance but in the opposite direction and has a limit of travel which is the same as the limit of travel of the table 11.

An important feature of the present invention resides in locating the point of connection between the chain 32 and table 11 midway between the guide bearings 14 and 15 and in the vertical plane which passes through the axis of the cutter head 12 and the screws 16. This insures maximum accuracy in translating the movement of the table 11 to the member 31 since the possibility of errors which might be introduced because of looseness and possible tilting of the table 11 in the guides 14 and 15 is substantially eliminated. Although the chain and sprockets shown and described are the preferred means for connecting the table 11 and member 31, other means of a like nature such as cable and pulleys and the like may be used without departing from the scope of the invention.

The micro-switch mounting member 31 comprises a base portion 38 preferably cylindrical in form and having an opening 39 extending therethrough for slidably receiving the rod 40. The rod 40 is mounted in a bearing 40a attached to a removable front panel section 54 and acts as a guide for the member 31 during vertical movement thereof and is preferably non-circular in cross-sectional shape, for example, square or rectangular, for cooperation with the correspondingly shaped opening 39 to prevent rotation of the member 31. The opening 39 is designed to have a snug sliding fit with the rod 40 to minimize relative angular movement of the member 31 and rod 40 and is located somewhat off center to balance the pull of the chain 32. The base portion 38 may be made of any desired material such as metal or the like but is required to be heavy enough to trip the micro-switches 41, 42 and 43 mounted on the bottom thereof as will appear more clearly hereinafter.

The micro-switches 41, 42 and 43 are preferably mounted on the base portion 38 in equi-angularly spaced relation as shown in Fig. 4 and are adapted to be closed when the plungers 44, 45 and 46 thereof come in contact with the stop members 47, 48 and 49 carried by the adjustable stop carrying member 30 and adjusted to stepped relation to close the switches successively. Each of the micro-switches 41, 42 and 43 is connected in series with a source of electric power 50 and suitable signal or indicating devices such as lights 51, 52 and 53 as shown in Fig. 7. The lights 51, 52 and 53 are mounted in the removable panel section 54 which is suitably secured over an aperture in the front of the planer casing as shown in Fig. 3 and as the micro-switches 41, 42 and 43 are closed by contact of their plungers 44, 45 and 46 with the stop members 47, 48 and 49 the lights 51, 52 and 53 glow to indicate to the operator that the machine is set for a predetermined cut thickness dimension. Although electrically operated lights are shown for purposes of exemplification and are preferred, any suitable signal or indicating means which will inform the operator that the machine is adjusted for a predetermined cut thickness dimension may be used without departing from the spirit and scope of the invention.

In order that the operator may tell at a glance whether the machine is accurately set on a desired cut thickness dimension or is set slightly above or slightly below the desired cut thickness dimension the lights 51, 52 and 53 are designed to be turned on successively as the table 11 moves up to and beyond the desired cut thickness dimension. Thus when the table 11 is adjusted for a cut thickness dimension slightly above, for example, 0.005 inch above the desired cut thickness dimension, the light 51, which may desirably be a white light, is turned on. When the table 11 is adjusted right on the desired cut thickness dimension the light 52, which is preferably green, will also be turned on so that in this position both the white and green lights will be burning. When the table 11 is adjusted for a cut thickness dimension slightly below, for example, 0.005 inch below the desired cut thickness dimension, the light 53, which is preferably red, will also be turned on so that all three lights will be burning.

This successive turning on of the lights 51, 52 and 53 may be accomplished by having the contact surfaces of the stops 47, 48 and 49 at graduated distances from the base of the stop carrying member 30. Thus the stop 47 may extend upwardly the greatest distance and actuate the plunger 44 of the switch 41 before the plungers 45 and 46 of the switches 42 and 43 contact their respective stop members. The stop 48 may extend upwardly a distance somewhat less than the stop 47 so as not to contact the plunger 45 of switch 42 until the member 31 has moved downwardly a distance equal to the difference in height between the stops 47 and 48. The stop 49 may be the shortest of the three and will not contact the plunger 46 of switch 43 until the member 31 is moved downwardly the required distance. Each of the stops 47, 48 and 49 is adjustably mounted in the member 30 so that their relative heights may be varied as desired to change the points of actuation of the plungers 44, 45 and 46 and their corresponding switches. Thus by proper adjustment of the stop members 47, 48 and 49 the lights 51, 52 and 53 can be made to indicate a selected cut thickness adjustment of the machine, and cut thickness adjustments above and below the selected cut thickness adjustment by any amount within the limits of adjustability of the stops.

Although it is desirable to have the micro-switches mounted so that the lower tips of the plungers lie in the same horizontal plane this is not absolutely necessary since minor variations may be compensated for by proper adjustment of the stop members 47, 48 and 49. It is important, however, that the micro-switches quickly snap to closed circuit position upon a predetermined slight movement of the plungers 44, 45 and 46 and that the plungers have the necessary overtravel to permit the switches to be successively closed and maintained in closed position while the member 31 is moving downwardly. This is accomplished by the micro-switch and plunger mechanism shown more particularly in Fig. 5.

The micro-switch mechanism comprises a housing 55 of Bakelite or the like having terminals 56 and 57 for connecting the switch in series with a source of electric power 50 and one of the signal or indicating devices 51, 52 or 53 as pointed out hereinbefore. The terminal 57 is connected to a flat metallic conducting member 58 mounted on a support in the housing 55 and having spaced spring fingers 59 and 60 joined together at their extended ends and carrying a contact 61. In normal open position of the switch the spring fingers 59 and 60 maintain the contact 61 against a stop member 62. In closed position the contact 61 rests against a conducting member 63 connected to the terminal 56 thus completing a circuit through the terminal 57, member 58, spring fingers 59 and 60, contact 61, and member 62 to terminal 56. A switch actuating plunger 64 is sidably mounted in the housing 55 and has a portion in contact with the spring finger 60 and a portion 66 projecting from the housing 55 and adapted to be contacted by the plunger mechanism referred to above. When the plunger 64 is moved inwardly a predetermined small distance the spring fingers 59 and 60 suddenly snap the contact 61 into engagement with the conducting member 63 to close the switch and actuate the signal or indicating device.

The plunger mechanism comprises a sleeve 70 secured to the housing 55 and slidably receiving the plunger 44. Plunger 44 is retained in the sleeve 70 by a flange abutting against a shoulder on the plunger and has a piston 73 slidably mounted therein and urged against an inturned flange 74 thereon by a spring 75. The piston 73 has a reduced portion 76 thereon extending through the flange 74 into contact with the projecting portion 66 of the plunger 64. The spring 75 is designed to maintain the piston 73 against the flange 74 until the plunger 44 has moved inwardly sufficiently to trip the switch to closed circuit position. Further pressure on the plunger 44 overcomes the resistance of the spring 75 so that the plunger 44 moves inwardly to compress the spring 75 against the piston 73. The extent of such movement of the plunger 44 after the switch is closed is sufficient to permit successive closing of the other switches.

Any form of micro-switch which will accomplish the results as above set forth may be used for the purposes of the present invention. One type which has proved quite satisfactory is the BZ-2RQ1 manufactured by the Micro Switch Corporation of Freeport, Illinois. Other types of a similar nature may also be used.

The stop carrying member 30 is mounted on the lower end of the rod 40 and is adjustable over a vertical distance equal to the travel of the table 11 and micro-switch mounting member 31. By suitable adjustment of the member 30 the stops 47, 48 and 49 may be positioned to actuate the switches 41, 42 and 43 and the indicating means 51, 52 and 53 at any desired point in the path of travel of the table 11 to thereby indicate that the table is positioned to obtain a particular cut thickness dimension and/or a cut thickness dimension slightly above or below that particular cut thickness dimension.

The member 30 is adjustably positioned by raising and lowering the rod 40 in its guide 40a. For this purpose the rod 40 is provided with rack teeth 79 adapted to mesh with a pinion 78 on the shaft 89. Shaft 89 extends outwardly through the panel section 54 and has a dial member 80 keyed thereto for rotating the shaft 89 and pinion 78 to vertically position the rod 40 and member 30. The dial member 80 is locked in a selected angular position by a ring member 81 secured to the panel section 54 and having teeth 82 on its outer face adapted to interlock with corresponding teeth 83 on the inner face of the dial member. The dial member 80 is normally held in locked engagement with the ring member 81 by a spring 84 mounted on the shaft 89 between the pinion 78 and the front panel section 54. The dial member 80 may be set in a desired position by pulling it outwardly against the action of the spring 84 and then rotating it. The pinion 78, of course, is sufficiently wider than the rack teeth 79 to permit this to be done while still retaining the pinion in mesh with the rack teeth.

To enable the operator to set the stop carrying member 30 for a desired cut thickness dimension the dial member 80 is provided with a scale for cooperation with a pointer 86 attached to the panel section 54. The scale is graduated in inches and fractions thereof and may be calibrated by positioning the member 30 at various points along its path of travel, adjusting the table 11 until the lights 51, 52 come on and then marking the dial opposite the pointer 86 to indicate the cut thickness dimension thus obtained. When several such points are obtained the spaces between may then be divided into any number of smaller divisions as required.

In the operation of the improved planer device of this invention the table 11 is first adjusted to receive the work in accordance with usual practice. The dial member 80 is then set so that the scale graduation corresponding to the desired cut thickness dimension is positioned opposite the pointer 86. The operator then passes the work through the machine the number of times required to reduce it to the desired thickness adjusting the machine between each pass to make the usual cut. When the adjustment of the machine is such that the resulting cut thickness dimension will be slightly above that for which the dial is set, for example, from a few thousandths to several thousandths of an inch above depending on the relative positions of the stops 47, 48 and 49, the white light will go on to warn the operator. He then adjusts the table until the green light comes on. This indicates that the planer is adjusted to give the cut thickness dimension for which the dial is set. If the red light goes on this indicates that the adjustment of the machine will give a cut thickness dimension slightly below, for example, a few thousandths below that for which the dial is set.

Where the work requires a number of passes through the machine it is frequently desirable to use the old type of indicator means such as the pointer and scale hereinbefore described to obtain an approximate final cut thickness dimension and then to use the device of the present invention to obtain an accurate final cut thickness dimension. In this case the operation is substantially the same as before, the pointer and scale indicating means being used for the machine adustments required to reduce the cut thickness dimension of the work to an approximate final cut thickness dimension somewhat above that desired.

While the various parts of the device may desirably be mounted almost entirely on a removable panel section suitably attached to the planer casing it is likewise possible, and sometimes desirable, to mount the parts directly on the casing and/or the frame of the machine. In either case the device may be built into the machine during the manufacture thereof or supplied as an attachment for application thereto after manufacture.

Although the device has been illustrated and described in connection with the use of three signals or indicators it is, of course, possible to use more or less than this number. Thus, for example, if it is desired to indicate only the final desired cut thickness adjustment one signal or indicator may be used and properly set to give the desired indication. Also, as pointed out hereinbefore, any suitable signal or indicating means adaptable to be operated to indicate the desired cut thickness dimension may be utilized for the purposes of the present invention. Electrically operated lights have been found to operate very satisfactorily and are preferred.

The expressions "cut thickness" and "cut thickness dimension" as used in the specification and claims are intended to mean the thickness of a piece of work resulting from a cutting operating for a particular adjustment of the planer.

Various modifications of the invention described and illustrated will most likely occur to those skilled in the art to which the invention relates and may be made without departing from the spirit of the invention, the scope of which is indicated in the attached claims.

I claim:

1. In a planer including a rotary cutter member and a work supporting table mounted for movement relative to the cutter member to vary cut thickness, three electric signals indicating respectively, minus, correct and plus as to a predetermined planer cut thickness, an electric circuit for the signals including separate electric switches for separately energizing each signal, actuating means operated by the work supporting table in its cut thickness varying movement to cause actuation of said switches successively in accordance with the position of the work supporting table relative to a predetermined cut thickness, a manually adjustable cut thickness selector coactive with a cut thickness calibrated scale adapted to adjust the switch closing operation of the switches by the actuating means relative to the work supporting table for different predetermined cut thicknesses and further manual means for simultaneously adjusting the work supporting table and said actuating means to effect successive actuation of at least two of said switches upon said work supporting table being brought to any cut thickness conforming to the cut thickness setting of the scale.

2. A planer according to claim 1, wherein the actuating mechanism for the electrical signals has operative connection with the work supporting table at a point in a plane common to the axis of the rotary cutter and the path of cut thickness varying movement of the work supporting table.

3. In a planer including a rotary cutter member and a work supporting table mounted for movement relative to the cutter member to vary cut thickness, three electric signals indicating respectively minus, correct and plus as to a predetermined planer cut thickness, an electric circuit for the signals including separate electrical switches for independently energizing each signal, a movable supporting member therefor, an operating linkage connecting said supporting member to the work supporting table for movement by the work supporting table in its cut thickness varying movement to effect actuation of said switches successively in accordance to the position of the work table relative to one predetermined cut thickness, actuating means including three switch closing elements in stepped relation to each other, a rod mounting said switch closing elements, a mounting supporting said rod for lengthwise movement to adjust the position of the switch closing elements relative to the switches for operation thereof in accordance with different predetermined cut thicknesses, the supporting member for the switches having guide surfaces engageable with the mounting rod for said switch closing elements and mounting said supporting member for sliding movement relative to said rod and adapted to maintain the switches and switch closing elements in alignment, a manually adjustable cut thickness selector having a cut thickness calibrated scale, and operatively connected to the rod for switch adjusting movement thereof.

4. A cut thickness indicating attachment for planers of the type having a cutter and a work supporting table mounted for relative movement to vary the cut thickness and comprising predetermined planer cut thickness indicating means, selective actuating means for effecting actuation of the indicating means at a predetermined planer cut thickness, means for interconnecting the actuating means and the movable one of the cutter and work supporting table of a planer for operation thereby during adjustment thereof to a predetermined cut thickness and manual adjusting means coactive with a planer cut thickness calibrated scale for changing actuation of the indicating means by the actuating means from one to another planer cut thickness.

5. A cut thickness indicating attachment for planers of the type having a cutter and a work supporting table mounted for relative movement to vary cut thickness and comprising a predetermined cut thickness electric signal, an electric circuit for the signal including an electric switch for energizing the signal switch actuating means including connecting means adapted to operatively connect the actuating means to the movable one of the cutter and work supporting table of a planer for operation thereby in the cut thickness adjusting movement of such movable planer member to effect closing of the signal energizing switch at a predetermined cut thickness and a manually adjustable cut thickness selector having a planer cut thickness calibrated scale adapted to change the closing operation of the signal switch by said actuating means relative to the movable one of the cutter and work supporting table of a planer for different predetermined cut thicknesses.

6. A cut thickness indicating attachment for planers of the type having a cutter and a work supporting table mounted for relative movement to vary cut thickness and comprising a predetermined cut thickness electric signal, an electric circuit for said signal, signal operating means including a signal energizing switch in said circuit and a switch closing actuator, a movably mounted position adjusting member mounting one of said signal operating means for adjustment relative to the other of said operating means, connecting means adapted to operatively connect the other of said signal operating means to the movable one of the cutter and work supporting table of a planer for operation in response to movement of said movable planer member to a predetermined cut thickness and a manually adjustable cut thickness selector having a cut thickness calibrated scale operative to adjust the movable position adjusting member.

7. In a planer having machine members including a cutter member and a work supporting table mounted for relative movement to vary cut thickness, predetermined cut thickness indicating means, actuating means operated by the movable one of said machine members through cut thickness varying movement thereof to effect actuation of said indicating means, manual adjusting means coactive with a planer cut thickness scale for changing actuation of the indicating means from one to another predetermined cut thickness, and further manual means for simultaneously adjusting the movable one of said machine members and said actuating means to effect actuation of said indicating means upon the movable one of said machine members being brought to any cut thickness conforming to the cut thickness setting of the scale.

8. In a planer having machine members including a cutter member and a work supporting table mounted for relative movement to vary cut thickness, predetermined cut thickness indicating means including an electric signal, an electric circuit for said signal including electric switch means, actuating means for said switch means, manually operated means coactive with a cut thickness indicating scale for effecting movement of one of said switch and switch actuating means relative to and independently of the other of said means to selectively preset said means for a predetermined cut thickness, and further manual means for simultaneously adjusting the movable one of said machine members and the other of said switch and switch actuating means independently of and relative to said one of the switch and switch actuating means to effect actuation of said switch means upon the movable one of said machine members being brought to a cut thickness conforming to the cut thickness for which the switch and switch actuating means have been preset.

9. In a planer having machine members including a cutter member and a work supporting table mounted for relative movement to vary cut thickness, predetermined cut thickness indicating means, a movable member operated by the movable one of said machine members through cut thickness varying movement thereof, a second movable member positioned in the path of movement of said first movable member for engagement therewith to effect actuation of said indicating means, manual means coactive with a cut thickness scale for effecting movement of said second movable member relative to but independently of said first movable member to selectively position said members for actuation of said indicating means at a predetermined cut thickness and further manual means for simultaneously adjusting the movable one of said machine members and said first movable member independently of and relative to said second movable member to effect actuation of said indicating means upon the movable one of said machine members being brought to any cut thickness conforming to the cut thickness reading of the scale.

10. In a planer having machine members including a cutter member and a work supporting table mounted for relative movement to vary cut thickness, predetermined cut thickness indicating means including an electrically operated signal, an electric circuit for said signal including an electric switch for energizing said signal, a movable supporting member for said switch, means connecting said supporting member to the movable one of said machine members for movement thereby in its cut thickness varying movement, manual means for adjustably moving the movable one of said machine members, switch actuating means adapted to close said switch upon the movable one of said machine members being brought to a predetermined cut thickness, and manual adjusting means coactive with a planer cut thickness calibrated scale for changing actuation of said switch by said actuating means from one to another predetermined cut thickness.

11. In a planer according to claim 8, indicating mechanism including in addition to said predetermined cut thickness electric signal mechanism a coacting thickness indicating gauge operated by the movable machine member in its cut thickness varying movement adapted to indicate progressive changes in cut thickness position of said movable machine member.

JAMES S. BALLANTINE.

REFERENCES CITED

The following references are of record in the file of this patent:

UNITED STATES PATENTS

| Number | Name | Date |
|---|---|---|
| 1,443,166 | Brown | Jan. 23, 1923 |
| 2,161,273 | Begun | June 6, 1939 |
| 2,177,821 | Dinzl | Oct. 31, 1939 |
| 2,187,102 | Schahmann | Jan. 16, 1940 |
| 2,213,606 | Meeker | Sept. 3, 1940 |
| 2,217,509 | Bryant | Oct. 8, 1940 |
| 2,433,585 | Warner | Dec. 20, 1947 |